United States Patent

Sugiyama

[11] Patent Number: 5,999,675
[45] Date of Patent: Dec. 7, 1999

[54] SILICON-BASED SEMICONDUCTOR PHOTODETECTOR WITH AN IMPROVED OPTICAL FIBER GUIDE GROOVE

[75] Inventor: Mitsuhiro Sugiyama, Tokyo, Japan

[73] Assignee: NEC Corporation, Tokyo, Japan

[21] Appl. No.: 08/934,750

[22] Filed: Sep. 22, 1997

[30] Foreign Application Priority Data

Sep. 20, 1996 [JP] Japan ................................ 8-249632

[51] Int. Cl.⁶ ........................................... G02B 6/30
[52] U.S. Cl. ................... 385/49; 385/52; 385/88; 257/432
[58] Field of Search ....................... 385/49, 50, 51, 385/88, 89, 52; 372/43, 48, 107, 108; 257/432, 19, 21

[56] References Cited

U.S. PATENT DOCUMENTS

| | | | |
|---|---|---|---|
| 4,210,923 | 7/1980 | North et al. | 257/432 |
| 4,294,510 | 10/1981 | Chappell | 385/52 |
| 5,747,860 | 5/1998 | Sugiyama et al. | 257/432 |

FOREIGN PATENT DOCUMENTS

| | | |
|---|---|---|
| 56-91481 | 7/1981 | Japan . |
| 7-231113 | 8/1995 | Japan . |
| 8-107232 | 4/1996 | Japan . |
| 8-316449 | 11/1996 | Japan . |

OTHER PUBLICATIONS

M. Sugiyama et al., "A selective epitaxial SiGe/Si planar photodetector for Si-based OEICs", pp. 22.7.2–22.7.4, IEEE, 1995.

Primary Examiner—Hemang Sanghavi
Attorney, Agent, or Firm—Young & Thompson

[57] ABSTRACT

The present invention provides a semiconductor photodetector formed over a substrate and being positioned adjacent to an optical fiber guiding groove also formed in said substrate bounding structure, said semiconductor photodetector having an optical waveguide layer including an optical absorption layer, wherein an edge portion of said optical waveguide layer is bounded to a side portion of said optical fiber guiding groove through an insulation layer having an refractive index higher than any parts of said optical waveguide layer.

14 Claims, 7 Drawing Sheets

SILICON-BASED SEMICONDUCTOR PHOTODETECTOR WITH AN IMPROVED OPTICAL FIBER GUIDE GROOVE

BACKGROUND OF THE INVENTION

The present invention relates to a semiconductor photodetector, and more particularly to a silicon-based semiconductor photodetector with an improved optical fiber guide groove.

Figure 1A:
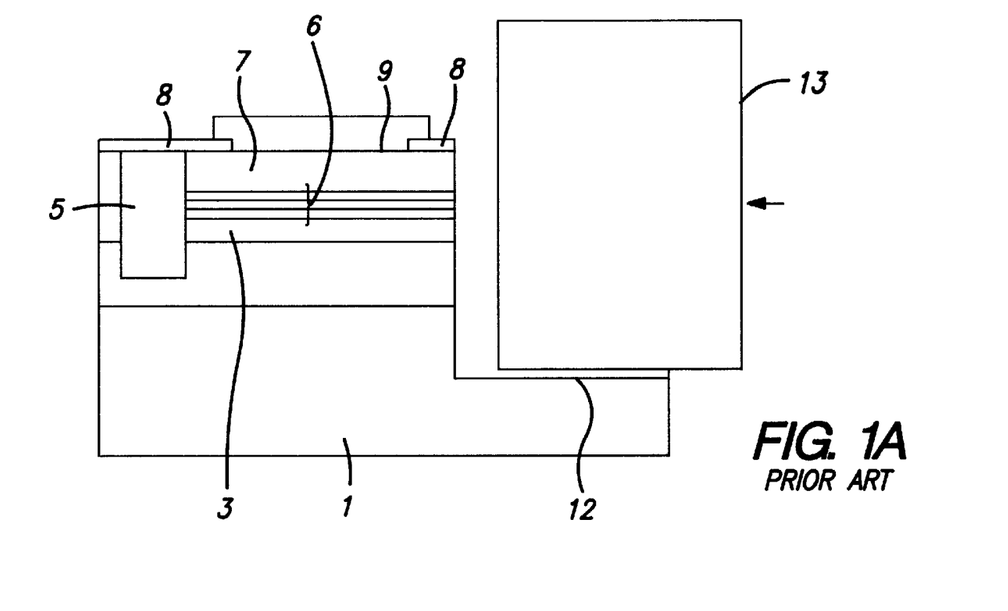
FIG. 1A is a fragmentary cross sectional elevation view illustrative of the first conventional silicon-based semiconductor photodetector provided adjacent to an optical fiber guiding trench groove formed in a semiconductor substrate taken along a IA—IA line in FIG. 1B.
Figure 1B:
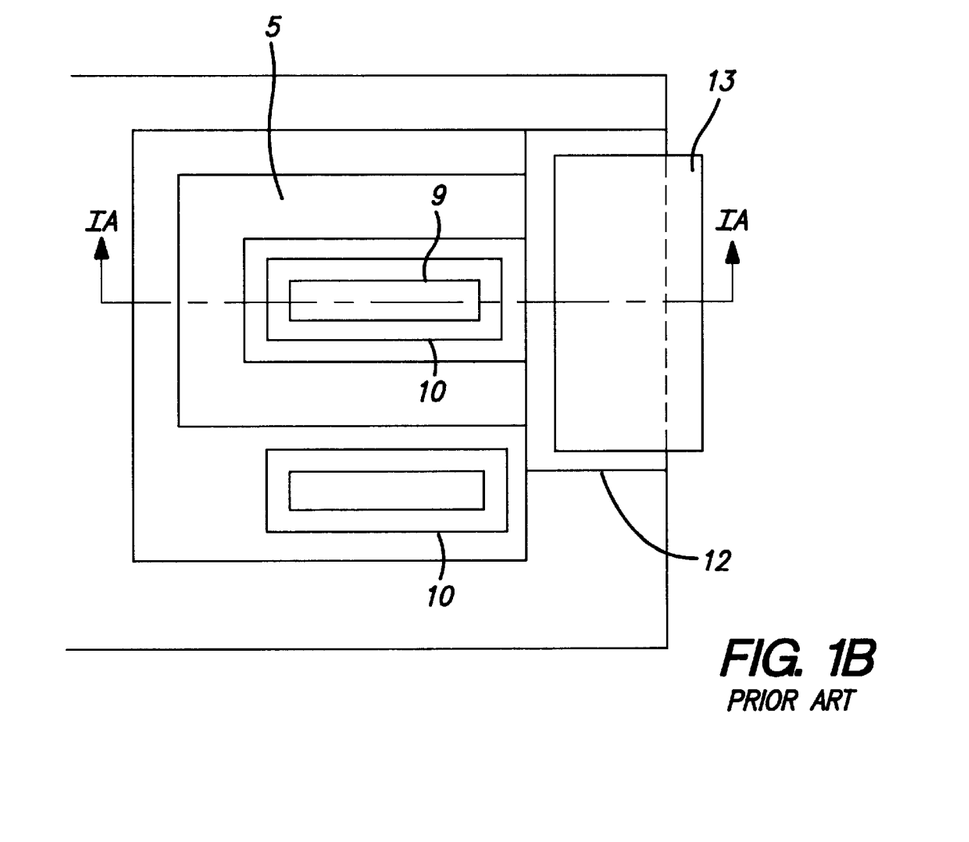
FIG. 1B is a plan view illustrative of the first conventional silicon-based semiconductor photodetector provided adjacent to an optical fiber guiding trench groove formed in a semiconductor substrate.

FIG. 1A is a fragmentary cross sectional elevation view illustrative of the first conventional silicon-based semiconductor photodetector provided adjacent to an optical fiber guiding trench groove formed in a semiconductor substrate taken along an IA—IA line in FIG. 1B. FIG. 1B is a plan view illustrative of the first conventional silicon-based semiconductor photodetector provided adjacent to an optical fiber guiding trench groove formed in a semiconductor substrate. This first conventional silicon-based semiconductor photodetector has an optical absorption layer with an edge portion directly shown to the optical fiber guiding trench groove. Recombination energy levels appear on the edge portion of the optical absorption layer. This causes a leakage current flowing through a p-n diode in the photodetector or a dark current of the photodetector. As a result, the signal-to-noise ratio is deteriorated.

Figure 2A:
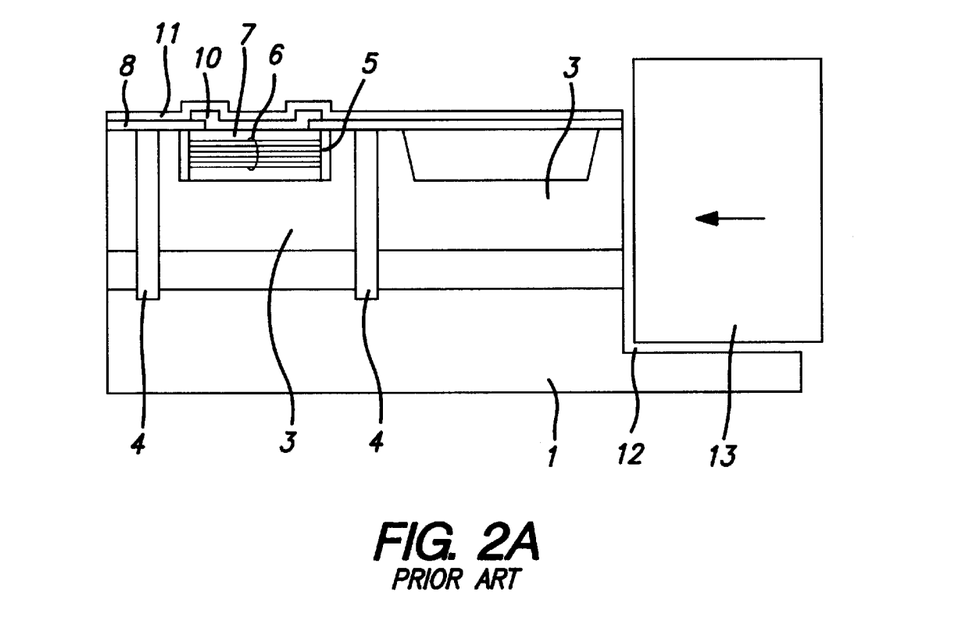
FIG. 2A is a fragmentary cross sectional elevation view illustrative of the second conventional silicon-based semiconductor photodetector provided adjacent to an optical fiber guiding trench groove formed in a semiconductor substrate taken along IIA—IIA line in FIG. 2B.
Figure 2B:
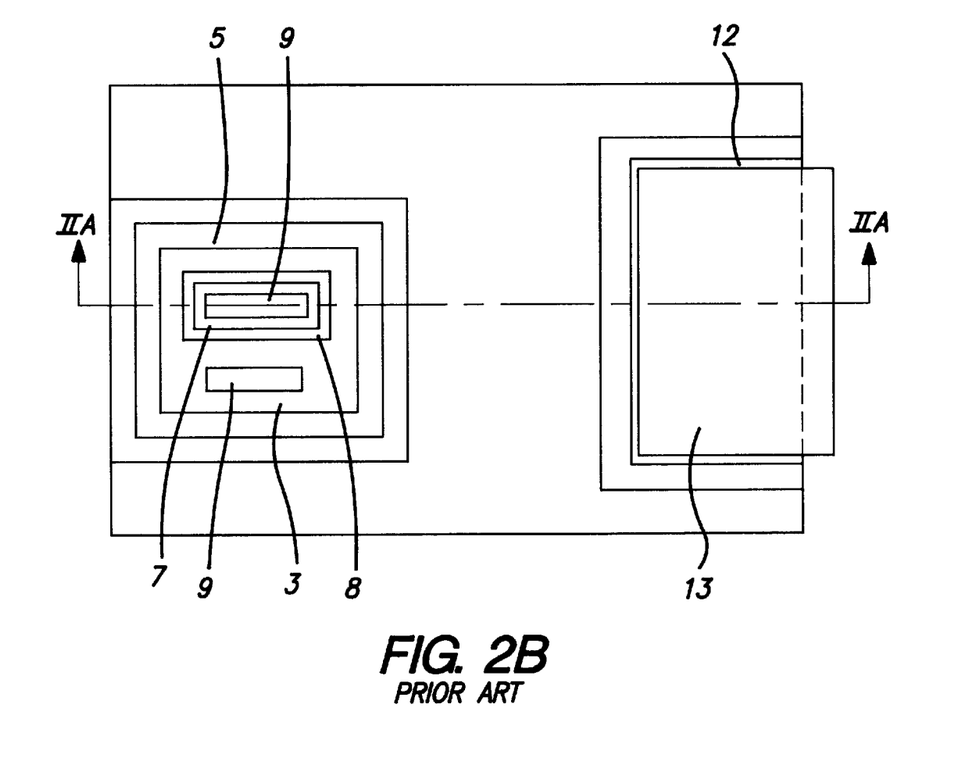
FIG. 2B is a plan view illustrative of the second conventional silicon-based semiconductor photodetector provided adjacent to an optical fiber guiding trench groove formed in a semiconductor substrate.

FIG. 2A is a fragmentary cross sectional elevation view illustrative of the second conventional silicon-based semiconductor photodetector provided adjacent to an optical fiber guiding trench groove formed in a semiconductor substrate taken along an IIA—IIA line in FIG. 2B. FIG. 2B is a plan view illustrative of the second conventional silicon-based semiconductor photodetector provided adjacent to an optical fiber guiding trench groove formed in a semiconductor substrate. The light having been propagated through the optical fiber is transmitted through many interfaces of the different materials having different refractive indexes. This means that the light is partially reflected many times at the interfaces of the different materials having different refractive indexes. This results in increased optical coupling loss.

Figure 3:
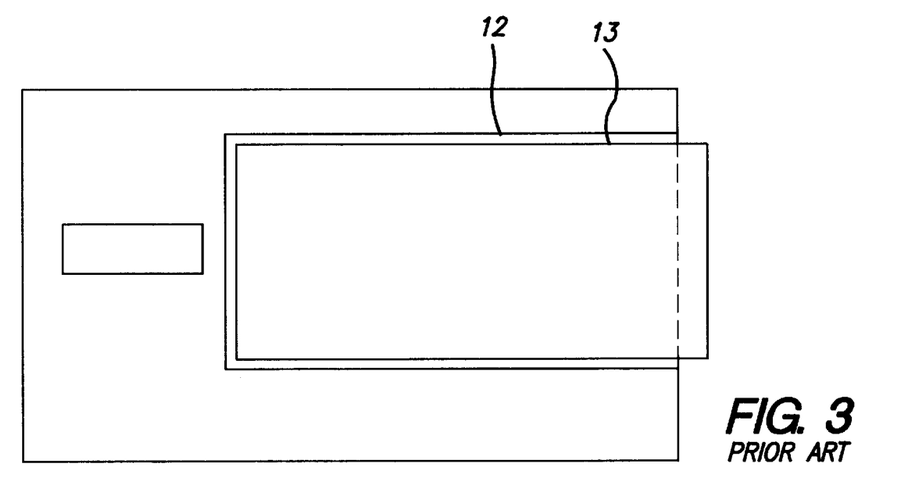
FIG. 3 is a schematic plan view illustrative of the third conventional silicon-based semiconductor photodetector provided adjacent to an optical fiber guiding trench groove formed in a semiconductor substrate.

FIG. 3 is a schematic plan view illustrative of the third conventional silicon-based semiconductor photodetector provided adjacent to an optical fiber guiding trench groove formed in a semiconductor substrate. The edge portion of the optical absorption layer is positioned adjacent to the end portion of the optical fiber. This means that the end portion of the optical fiber may hit to the edge portion of the optical waveguide or the optical absorption layer. The end portion of the optical fiber 13 and the optical absorption layer 6 or the silicon oxide isolation layer 4 may receive damage due to the direct contact to the end portion of the optical fiber.

In the above circumstances, it had been required to develop a novel semiconductor photodetector formed over a substrate and being positioned adjacent to an optical fiber guiding groove also formed in said substrate bounding structure, said semiconductor photodetector having an optical waveguide layer including an optical absorption layer free from the above problems and disadvantages.

SUMMARY OF THE INVENTION

Accordingly, it is an object of the present invention to provide a novel bounding structure between an edge portion of an optical waveguide layer including an optical absorption layer in a semiconductor photodetector and a side portion of an optical fiber guiding groove free from the above problems and disadvantages.

It is a further object of the present invention to provide a semiconductor photodetector formed over a substrate positioned adjacent to an optical fiber guiding groove also formed in the substrate bounding structure, with the semiconductor photodetector having an optical waveguide layer including an optical absorption layer free from the above problems and disadvantages.

The above and other objects, features and advantages of the present invention will be apparent from the following description.

The present invention provides a novel bounding structure between an edge portion of an optical waveguide layer including an optical absorption layer in a semiconductor photodetector and a side portion of an optical fiber guiding groove, wherein said edge portion of said optical waveguide layer is bounded to said side portion of said optical fiber guiding groove through an insulation layer having a refractive index higher than any parts of said optical waveguide layer.

It is preferable that said insulation layer is positioned to be retracted from a side wall of said optical fiber guiding groove so as to form a space which bounds said insulation layer to an edge of an optical fiber having been set in said optical fiber guiding groove.

It is further preferable that said space comprises an aperture formed in a vertical side wall of said optical fiber guiding groove and said aperture remains unchanged in height and width from said insulation layer toward said edge of said optical fiber having been set in said optical fiber guiding groove.

It is also preferable that said space comprises an aperture formed in a vertical side wall of said optical fiber guiding groove and said aperture increases in section area from said insulation layer toward said edge of said optical fiber having been set in said optical fiber guiding groove.

It is also preferable that said insulation layer comprises a silicon oxide layer or a silicon nitride layer.

The optical absorption layer is bounded by the insulation layer from the space or aperture adjacent to the optical fiber guiding trench groove or adjacent to the end of the optical fiber set in the optical fiber guiding trench groove. A light having been propagated through a core portion of the optical fiber is transmitted through the space or aperture to the insulation layer and then injected into the insulation layer. A small part of the light is reflected at an interface between the space or aperture and the insulation layer. The light having been propagated through the insulation layer is further partially reflected at an interface between the insulation layer and the optical absorption layer. The remaining majority parts of the light may be injected into the optical absorption layer. Since the optical absorption layer is covered by the insulation layer but not shown, a remarkable reduction in optical coupling loss due to reflection at interfaces between different materials can be obtained. Further, it is possible to suppress any substantive increase in dark current of a leakage current flowing between the n-type and p-type silicon layers in the photodetector. Furthermore, remarkable increases both in signal-to-noise ratio and in absorption coefficient of the photodetector can also be obtained.

The above retracted position of the edge portion of the optical absorption layer from the vertical side wall of the optical fiber guiding trench groove avoids direct contact between the end portion of the optical fiber and the optical absorption layer or the insulation layer This allows the end portion of the optical fiber and the optical absorption layer or the insulation layer to be free from any possible damage due to the direct contact.

In addition, it is preferable that the depth of the optical fiber guiding trench groove is so determined that the optical absorption layer has substantially the same level as the core portion of the optical fiber when set in the optical fiber guiding trench groove.

BRIEF DESCRIPTIONS OF THE DRAWINGS

Preferred embodiments according to the present invention will be described in detail with reference to the accompanying drawings.

DESCRIPTION OF THE PREFERRED EMBODIMENTS

A first embodiment according to the present invention will be described with reference to FIGS. 4, 5, 6, 7A through 7G and 8.

Figure 4:
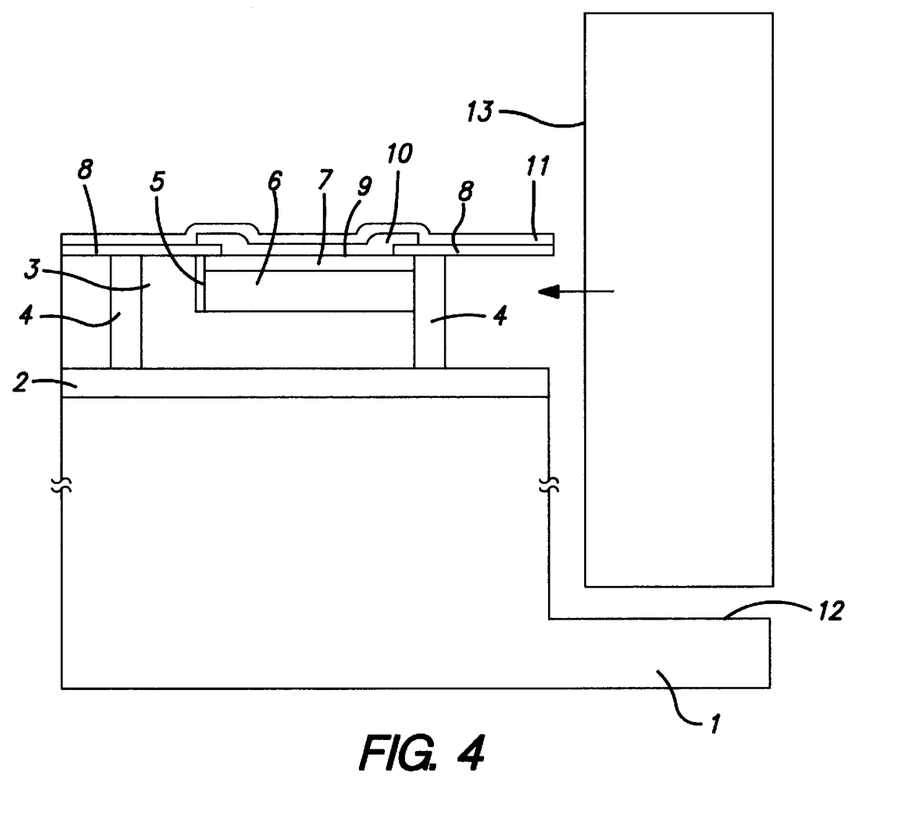
FIG. 4 is a fragmentary cross sectional elevation view illustrative of a novel semiconductor photodetector formed adjacent to an optical fiber guiding trench groove formed in a semiconductor substrate taken along a IV—IV line in FIG. 6 in a first embodiment according to the present invention.
Figure 5:
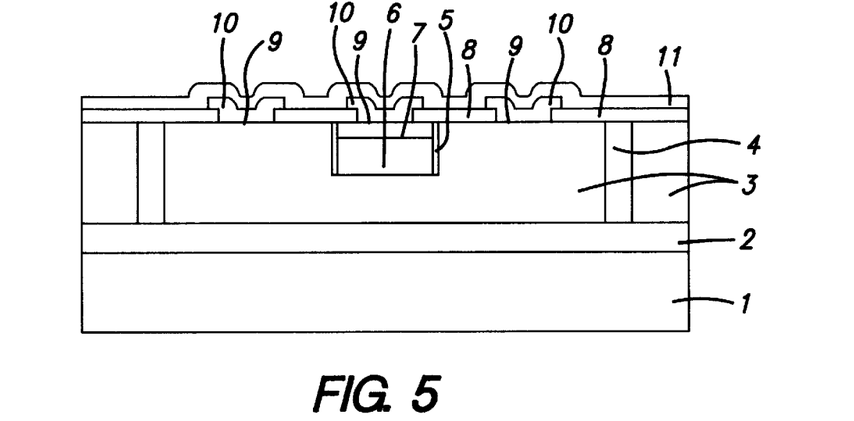
FIG. 5 is a fragmentary cross sectional elevation view illustrative of a novel semiconductor photodetector formed adjacent to an optical fiber guiding trench groove formed in a semiconductor substrate taken along a V—V line in FIG. 6 in a first embodiment according to the present invention.
Figure 6:
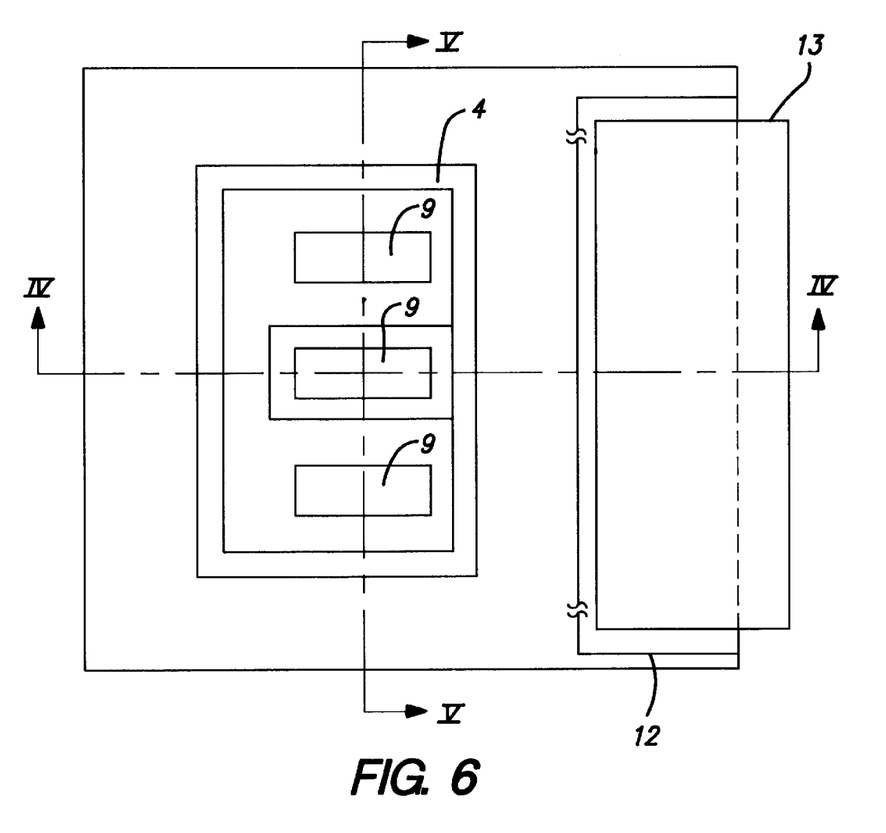
FIG. 6 is a plan view illustrative of a novel semiconductor photodetector formed adjacent to an optical fiber guiding trench groove formed in a semiconductor substrate in a first embodiment according to the present invention.

A structure of the novel semiconductor photodetector formed adjacent to the optical fiber guiding trench groove formed in a semiconductor substrate will be described. A silicon substrate 1 has an optical fiber guiding trench groove 12 for guiding an end portion of an optical fiber 13. A silicon oxide film 2 is provided on a top surface of the silicon substrate 1. An n-type silicon layer 3 is provided on a top surface of the silicon oxide film 2 except for a side region adjacent to the optical fiber guiding trench groove 12. A silicon oxide isolation layer 4 is provided over the silicon oxide film 2 surrounds a photodetector region of the n-type silicon layer 3 for formation of a semiconductor photodetector. One side of the silicon oxide isolation layer 4 covers the edge of the n-type silicon layer 3 so that the edge of the n-type silicon layer 3 is bounded by the one side of the silicon oxide isolation layer 4 to a space positioned over the side region of the silicon oxide film 2 and also positioned adjacent to the optical fiber guiding trench groove 12. A small trench groove is provided in the n-type silicon layer 3 so that an end of the small trench groove is bounded by an upper half part of the one side portion of the silicon oxide isolation layer 4, whilst an opposite end of the small trench groove is terminated by a silicon oxide film formed on a vertical side wall of the small trench groove. An optical absorption layer 6 is selectively and epitaxially grown on a bottom surface of the small trench groove so that the optical absorption layer 6 is buried within the small trench groove except for an upper region thereof. A p-type contact silicon layer 7 having a higher impurity concentration for low contact resistance or ohmic contact is subsequently and epitaxially grown on the optical absorption layer 6 so that the p-type contact silicon layer 7 is buried within the upper region of the small trench groove whereby a top surface of the p-type contact silicon layer 7 has the same level as the top surface of the n-type silicon layer 3. A silicon oxide film 8 is provided which extends over leveled top surfaces of the n-type silicon layer 3, the silicon oxide isolation layer 4, the silicon oxide film 5 and the p-type contact silicon layer 7. Contact holes 9 are made in the silicon oxide film 8 so that aluminum electrodes 10 are formed to be made into contact through the contact holes 9 to the p-type contact silicon layer 7. Since as described above the p-type contact silicon layer 7 has a high impurity concentration, then the contact resistance of the aluminum electrodes 10 to the p-type contact silicon layer 7 is low. The aluminum electrodes 10 extend over the p-type contact silicon layer 7 shown through the contact holes 9 and over contact hole peripheral portions of the silicon oxide film 8. A silicon oxide film 11 is provided which extends over the silicon oxide film 8 and the aluminum electrodes 10.

The optical absorption layer 6 is bounded by the silicon oxide isolation layer 4 from the space or aperture adjacent to the optical fiber guiding trench groove 12 or adjacent to the end of the optical fiber 13 set in the optical fiber guiding trench groove 12. A light having been propagated through a core portion of the optical fiber 13 is transmitted through the space or aperture to the silicon oxide isolation layer 4 and then injected into the silicon oxide isolation layer 4. A small part of the light is reflected at an interface between the space or aperture and the silicon oxide isolation layer 4. The light having been propagated through the silicon oxide isolation layer 4 is father partially reflected at an interface between the silicon oxide isolation layer 4 and the optical absorption layer 6. The remaining majority parts of the light may be injected into the optical absorption layer 6. Since the optical absorption layer 6 is covered by the silicon oxide isolation layer 4, a remarkable reduction in optical coupling loss due to reflection at interfaces between different materials can be obtained. Further, it is possible to suppress any substantive increase in dark current due to leakage current flowing between the n-type and p-type silicon layers in the photodetector. Furthermore, remarkable increases both in signal-to-noise ratio and in absorption coefficient of the photodetector can also be obtained.

The above retracted position of the edge portion of the optical absorption layer 6 from the vertical side wall of the optical fiber guiding trench groove 12 avoids direct contact between the end portion of the optical fiber 13 and the optical absorption layer 6 or the silicon oxide isolation layer 4. This allows the end portion of the optical fiber 13 and the optical absorption layer 6 or the silicon oxide isolation layer 4 to be free from any possible damage due to the direct contact.

In addition, it is preferable that the depth of the optical fiber guiding trench groove 12 is so determined that the optical absorption layer 6 has substantially the same level as the core portion of the optical fiber 13 when set in the optical fiber guiding trench groove 12.

Fabrication processes for the above novel photodetector will be described with reference to FIGS. 7A through 7G and 8.

Figure 7A:
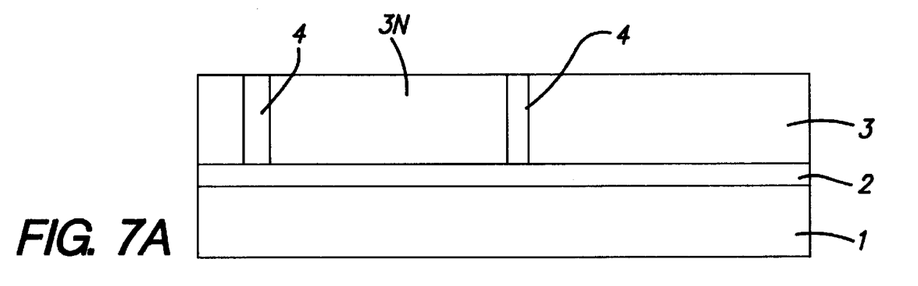
FIG. 7A through 7G are fragmentary cross sectional elevation views illustrative of a novel semiconductor photodetector formed adjacent to an optical fiber guiding trench groove in sequential steps involved in a novel fabrication method in a first embodiment according to the present invention.

With reference to FIG. 7A, a silicon oxide film 2 is formed on a top surface of a silicon substrate 1. An n-type silicon layer 3 is then formed on a top surface of the silicon oxide film 2 to form a silicon-on-insulation substrate. A silicon oxide isolation layer 4 is formed in the n-type silicon layer 3 so that the silicon oxide isolation layer 4 surrounds a photodetector formation region 3N of the n-type silicon layer 3.

Figure 7B:
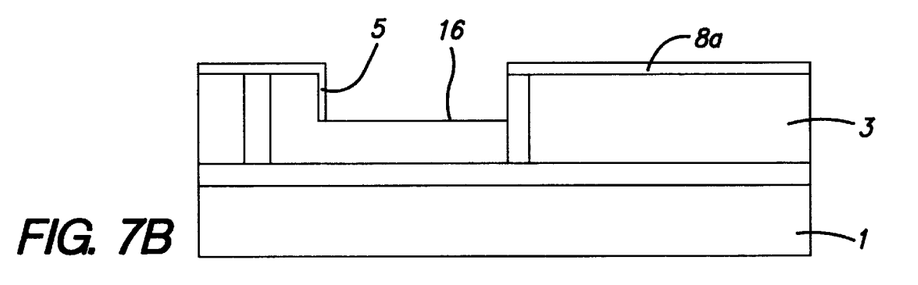

With reference to FIG. 7B, a silicon oxide film 8a is selectively formed on a top surface of the n-type silicon layer 3. The n-type silicon layer 3 is selectively etched by use of the silicon oxide film 8a as a mask to form a small trench groove 16 in the n-type silicon layer 3. One end portion of the small trench groove 16 is bounded by one side of the silicon oxide isolation layer 4 which surrounds the photodetector formation region 3N of the n-type silicon layer 3 whilst an opposite end of the small trench groove 16 is terminated by a vertical side wall of the n-type silicon layer 3. A silicon oxide film 5 is then entirely formed which covers the bottom surface and the vertical side walls of the small trench groove 16. The silicon oxide film 5 is thereafter etched back so that the silicon oxide film 5 on the bottom surface of the small trench grove 16 is selectively removed whilst the silicon oxide film 5 remains on the vertical side walls of the small trench groove 16.

Figure 7C:
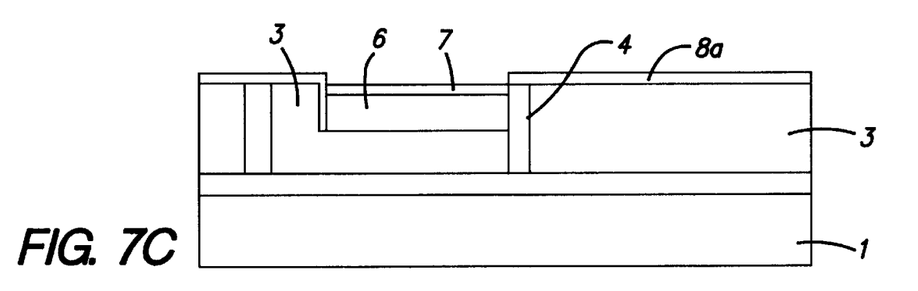

With reference to FIG. 7C, an optical absorption layer 6 is selectively and epitaxially grown on the bottom spice of the trench groove 16. The silicon oxide films 5 and 8a cause the above selective epitaxial growth of the optical absorption layer 6 in the vertical direction from the bottom surface of the small trench groove 16. The above selective epitaxial growth of the optical absorption layer 6 is continued so that the optical absorption layer 6 is buried within the small trench groove 16 except for an upper region of the small trench groove 16. Subsequently, a p-type contact layer 7 is also selectively and epitaxially grown on the optical absorption layer 6 so that the p-type contact layer 7 is buried in the upper region of the small trench groove 16 and the top surface of the p-type contact layer 7 has the same level as the top surface of the n-type silicon layer 3. The optical absorption layer 6 may be made of SiGe when the photodetector is used in the long wavelength system of not less than 1 micrometers. If, however, the photodetector is used in the wavelength system of not more than 0.8 micrometers, the optical absorption layer 6 may be made of Si. In any event, the optical absorption layer 6 may be made of a single crystal Si-based intrinsic semiconductor free of impurity.

Figure 7D:
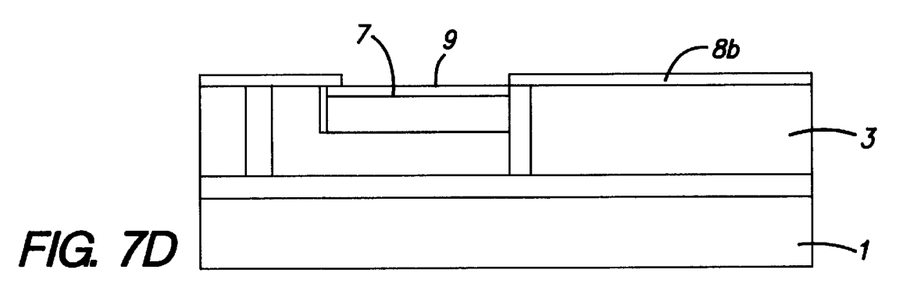

With reference to FIG. 7D, the silicon oxide film 8a is removed. A silicon oxide film 8b is entirely grown on the top surfaces of the n-type silicon layer 3, the silicon oxide isolation layer 4, the silicon oxide films 5 and the p-type contact layer 7. Contact holes 9 are made in the silicon oxide film 8b to have a majority part of the top surface of each of the p-type contact layer 7 and the n-type silicon layer 3 shown through the contact holes.

Figure 7E:
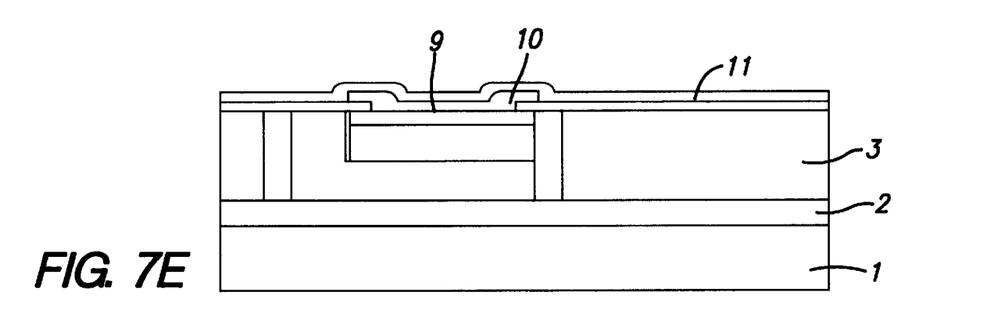

With reference to FIG. 7E, aluminum electrodes 10 are formed which cover the contact holes 9 so that the aluminum electrodes 10 are made into contact with the p-type contact layer 7 and the n-type silicon layer 3. A silicon oxide film 11 is entirely formed which covers the aluminum electrodes 10 and the silicon oxide film 8a.

Figure 7F:
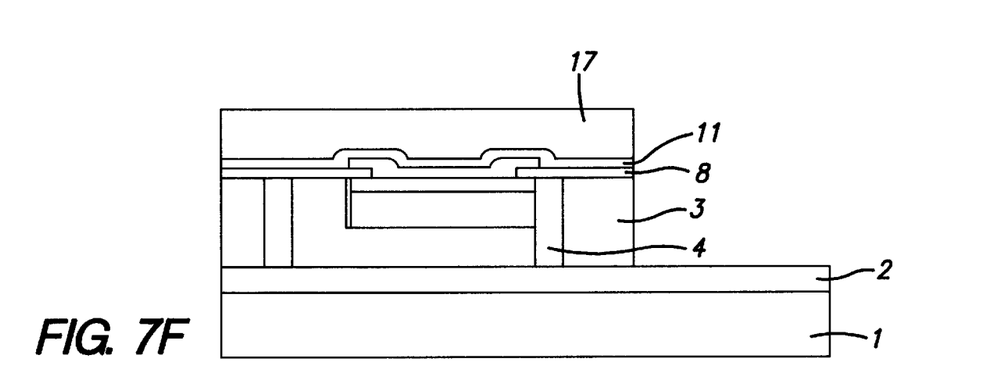

With reference to FIG. 7F, a photo-resist film 17 having a thickness of not less than 2 micrometers is applied on an entire surface of the silicon oxide film 11. An opening is made in the photo-resist film 17 so that the opening is positioned over a region for formation of the optical fiber guiding trench groove. The silicon oxide films 11 and 8 as well as the n-type silicon layer 3 are selectively and anisotropically etched so that the surface of the silicon oxide film 2 is shown.

Figure 7G:
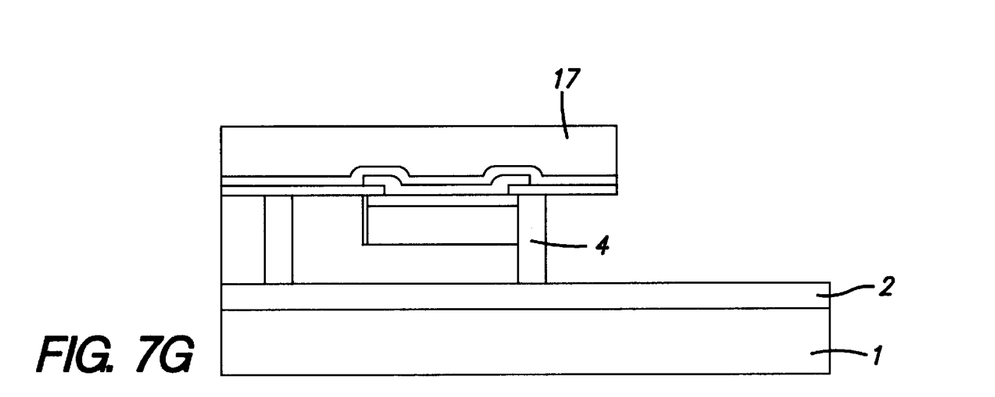

With reference to FIG. 7G, the n-type silicon layer 3 remaining under the photo-resist film 17 and positioned around the silicon oxide isolation layer 4 is then isotropically etched so that the one side of the silicon oxide isolation layer 4 is shown.

Figure 8:
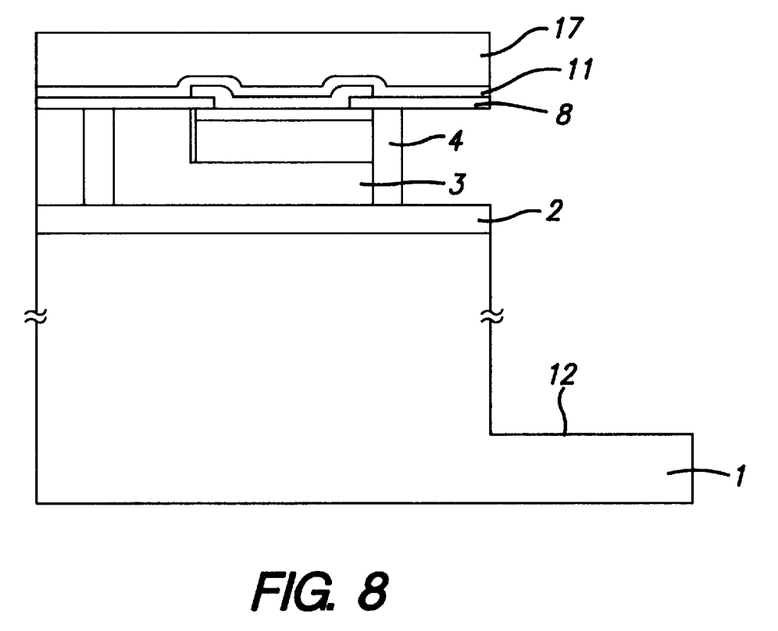
FIG. 8 is a fragmentary cross sectional elevation view illustrative of a novel semiconductor photodetector formed adjacent to an optical fiber guiding trench groove in the final step involved in a novel fabrication method in a first embodiment according to the present invention.

With reference to FIG. 8, the silicon oxide film 2 and the silicon substrate 1 are anisotropically etched by use of the photo-resist film 17 as a mask to form the optical fiber guiding trench groove 12. The depth of the optical fiber guiding trench groove 12 is preferably a half of the diameter of the optical fiber so that the optical absorption layer 6 has the same level as the core portion of the optical fiber having been set in the optical fiber guiding trench groove 12. If the single mode optical fiber having a diameter of about 125 micrometers, the depth of the optical fiber guiding trench groove 12 is set about 65 micrometers.

Figure 9:
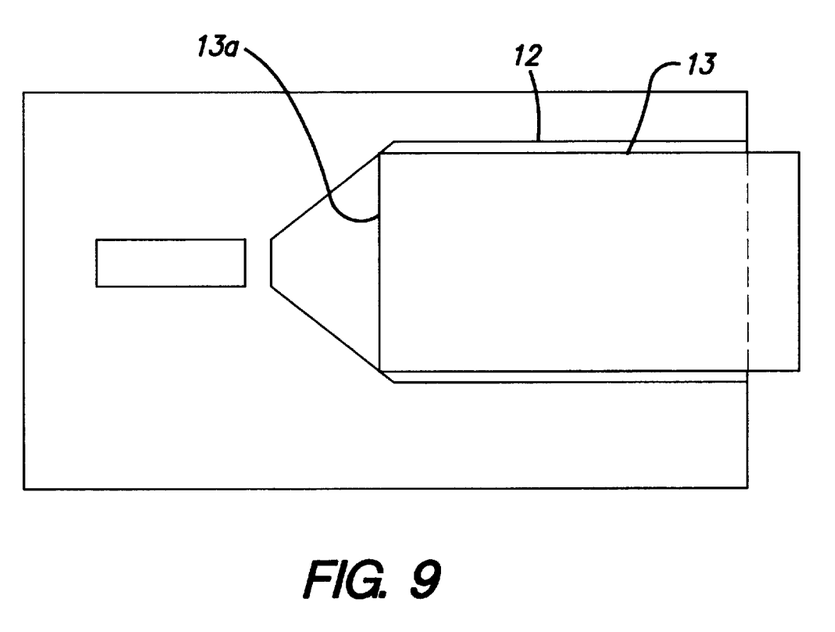
FIG. 9 is a schematic plane view illustrative of a novel semiconductor photodetector formed adjacent to an optical fiber guiding trench groove formed in a semiconductor substrate in a second embodiment according to the present invention.

A second embodiment according to the present invention will be described with reference to FIG. 9.

The second embodiment is different from that of first embodiment in that the space adjacent to the one side of the silicon oxide isolation layer 4 and also adjacent to the optical fiber guiding trench groove varies to increase in section area from said insulation layer toward said edge of said optical fiber having been set in said optical fiber guiding groove. As a result, the end portion of the optical fiber 13a is made into contact with the radially widening walls so that the distance of the end portion of the optical fiber to the silicon oxide isolation layer 4 is fixed to obtain a constant absorption coefficient of the photodetector.

The remaining structure, operation, and benefits of the photodetector and the optical fiber guiding trench groove are the same as in the first embodiment.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A semiconductor photodetector, comprising:

an optical waveguide on a surface of a substrate;

a photo absorbing layer within said optical waveguide;

an isolation layer within said optical waveguide surrounding said photo absorbing layer on four sides;

an optical fiber guiding groove in said substrate and having an end portion; and at least one cantilevered insulating film which overhangs said isolation layer and extends from said isolation layer to said end portion of said optical fiber guiding groove so as to define a space between said isolation layer and said end portion of said optical fiber guiding groove.

2. The semiconductor photodetector of claim 1, wherein said isolation layer has a refractive index greater than any part of said optical waveguide.

3. The semiconductor photodetector of claim 2, wherein said isolation layer is silicon oxide.

4. The semiconductor photodetector of claim 2, wherein said isolation layer is silicon nitride.

5. The semiconductor photodetector of claim 1, wherein said space has a constant cross-sectional area.

6. The semiconductor photodetector of claim 1, wherein said space is filled with a gas.

7. The semiconductor photodetector of claim 1, wherein said optical waveguide is defined by said at least one cantilevered insulating film and a second insulating film directly on said surface of said substrate.

8. The semiconductor photodetector of claim 1, wherein said at least one cantilevered insulating film comprises two silicon oxide films directly atop one another.

9. A method of fabricating a semiconductor photodetector, comprising the steps of:

forming a first insulation film on a horizontal top surface of a substrate;

forming a waveguide body layer on the first insulation film;

forming a photo absorption layer in the waveguide body;

surrounding the photo absorption layer on four sides with an isolation layer;

covering the photo absorption layer by at least one insulating film;

vertically etching the at least one insulating film and the waveguide body layer to expose a first portion of surface of the first insulation film; and horizontally etching the waveguide body layer underneath the at least one insulating film to a vertical surface of the isolation layer to define a space.

10. The method of claim 9, wherein the step of surrounding the photo absorption layer on four sides with an isolation layer further comprises selecting an isolation layer material having a refractive index greater than any part of the semiconductor photodetector to reduce optical coupling losses.

11. The method of claim 9, wherein the step of horizontally etching underneath the at least one insulating film comprises the step of making the space have a constant cross-sectional area.

12. The method of claim 9, further comprising the step of forming an optical fiber guiding trench groove by vertically etching through the first portion of the first insulation film and into the substrate.

13. The method of claim 12, further comprising the step of placing an optical fiber in the guiding groove.

14. The method of claim 13, further comprising the step of controlling the vertical etching depth of the optical fiber guiding trench groove so that a center of the optical fiber is aligned with the photo absorbing layer.

* * * * *